United States Patent

Bogdanović et al.

[11] Patent Number: 6,106,801
[45] Date of Patent: Aug. 22, 2000

[54] METHOD FOR THE REVERSIBLE STORAGE OF HYDROGEN

[75] Inventors: Borislav Bogdanović; Manfred Schwickardi, both of Mülheim an der Ruhr, Germany

[73] Assignee: Studiengesellschaft, Germany

[21] Appl. No.: 08/983,320

[22] PCT Filed: Jul. 12, 1996

[86] PCT No.: PCT/EP96/03076

§ 371 Date: Jan. 14, 1998

§ 102(e) Date: Jan. 14, 1998

[87] PCT Pub. No.: WO97/03919

PCT Pub. Date: Feb. 6, 1997

[30] Foreign Application Priority Data

Jul. 19, 1995 [DE] Germany .................. 195 26 434

[51] Int. Cl.⁷ ............... C01B 3/04; C01B 6/24; C09K 3/00
[52] U.S. Cl. ............... 423/648.1; 252/182.35; 423/644; 423/658.2
[58] Field of Search ................ 423/644, 658.2, 423/648.1; 252/182.35; 420/900

[56] References Cited

U.S. PATENT DOCUMENTS 3,313,598 4/1967 Gluckstein .
3,931,395 1/1976 Beckert et al. .
4,563,343 1/1986 Nelson ..................... 423/644

FOREIGN PATENT DOCUMENTS 1909732 2/1970 Germany .

*Primary Examiner*—Wayne Langel
*Attorney, Agent, or Firm*—Norris McLaughlin & Marcus

[57] ABSTRACT

A process for the reversible storage of hydrogen, characterized in that the complex alkali metal aluminium hydrides (alkali metal alanates) of general formula 1

$$M^1_{p(1-x)} M^2_{px} AlH_{3+p} \tag{1}$$

$M^1 = Na, K; M^2 = Li, K$ $0 \leq x \leq \sim 0.8; 1 \leq p \leq 3$ are used as the reversible hydrogen storage materials.

24 Claims, 7 Drawing Sheets

Na₃AlH₆  H₂ desorption at normal pressure starting material (uncycled)
dopant: 2 mole % of Ti(OBu)₄

METHOD FOR THE REVERSIBLE STORAGE OF HYDROGEN

This application is a 371 of PCT/EP96/03076, which was filed on Jul. 12, 1996.

BACKGROUND OF THE INVENTION

1. Field of the Invention

The present invention relates to a process for the reversible storage of hydrogen in the form of complex alkali metal aluminium hydrides (alkali metal alanates).

2. Description of Related Art

The methods for the storage of hydrogen used today in the art are predominantly the storage as a compressed gas in pressure tanks, at normal pressure in gasometers, and at low temperatures ($\leq 20$ K) as liquid hydrogen.

SUMMARY OF THE INVENTION

A more recent method for hydrogen storage ($H_2$ storage) which is currently being developed, especially for the use of hydrogen as a fuel (combustible), is based on the reversible thermal dissociation of metal hydrides ($MH_n$, Equation 1; H. Buchner, "Energie-speicherung in Metallhydriden", Springer-Verlag 1982; G. Sandrock et al., in "Hydrogen in Intermetallic Compounds II", page 197 (Ed. L. Schlapbach), Springer-Verlag 1992). In addition to $H_2$ storage for stationary or mobile use, reversible metal hydride/metal systems (Equation 1) can be used technically for a number of other, potential or already realized, applications, such as hydrogen separation, purification and compression, heat storage, heat conversion and refrigeration (heat pumps), and as electrodes for electric batteries.

$$MH_n + heat \rightleftharpoons M + n/2 H_2 \quad (1)$$

M=metal, metal alloy, intermetallic compound

The reversible $H_2$ storage in the form of metal hydrides has several advantages over conventional storage methods. Over compressed $H_2$ gas, metal hydrides have considerable advantages with respect to the achievable volumetric storage density. In addition, metal hydrides have the advantage, with respect to safety, that their hydrogen dissociation pressure is lower by powers of ten as compared to the same concentration of pressurized hydrogen. The volumetric $H_2$ densities achievable with hydride containers reach those of liquid hydrogen containers without the necessity of using cryotechnology, which is expensive and cumbersome. The disadvantages of the latter can be seen, inter alia, from the fact that the recovery of one unit of energy of liquid hydrogen requires 2.5 to 5 times as high an expense of primary energy.

The main drawback of the currently known reversible metal hydrides as $H_2$ storage materials, as compared to liquid hydrogen, is their relatively low storage density per weight of storage material (expressed in % by weight of $H_2$ in the metal hydride) Magnesium hydride ($MgH_2$, 7.6% by weight of $H_2$) and hydrides of magnesium alloys ($Mg_2NiH_4$, 3.7% by weight of $H_2$) can compete technically with liquid hydrogen in this respect, provided that enough heat above 300° C. is available for desorption of the hydrogen from the hydride.

The most serious disadvantage of the so-called low and medium temperature hydrides known today (H. Buchner, 1982, pages 26–29) is the high costs of the intermetallic compounds and alloys used for $H_2$ storage while their $H_2$ storage capacity is lower by a factor of 4–5 than that of $MgH_2$ ($LaNi_5$: 1.4%; TiFe: 1.9% by weight of $H_2$). From this point of view, it appears highly desirable and technically necessary to develop novel reversible low and/or medium temperature metal hydrides with higher $H_2$ storage capacities than are known to date (Sandrock 1992, page 220; S. Suda, G. Sandrock, Ztschr. Physikal. Chem., Neue Folge 1994, 183, 149).

It has now been surprisingly found that the complex sodium and potassium alanates and the mixed sodium-lithium, sodium-potassium and potassium-lithium alanates of general formula 1 are suitable as reversible $H_2$ storage materials under certain conditions. In addition, it has been found that the properties of compounds 1 as reversible $H_2$ storage materials can be still improved considerably by doping with foreign metals, intermetals and their hydrides according to the invention.

$$M^1_{p(1-x)} M^2_{px} AlH_{3+p} \quad (1)$$

$M^1$=Na, K  $M^2$=Li, K  $0 \leq x \leq \sim 0.8$  $1 \leq p \leq 3$

Sodium alanate, $NaAlH_4$, is produced on a technical scale. $Na_3AlH_6$ can be prepared from $NaAlH_4$ and NaH in the presence of hydrogen (Equation 2) (L. Zakharkin, V. Gavrilenko, Dokl. Akad. Nauk SSSR 1962, 145, 793, Engl. Vol. 145, 656).

$$NaAlH_4 + 2NaH \rightarrow Na_3AlH_6 \quad (2)$$

The mixed alanate $Na_2LiAlH_6$, as yet unknown, was synthesized under hydrogen pressure according to Equation 3.

$$NaAlH_4 + NaH + LiH \rightarrow Na_2LiAlH_6 \quad (3)$$

From the literature (E.Ashby, P. Kobetz, Inorg. Chem. 1966, 5, 1615; T. Dymova et al., Dokl. Akad. Nauk SSSR 1975, 224, 591, Engl. 556), it is known that the thermal dissociation of solid $NaAlH_4$ takes place in two steps: in the first step, $NaAlH_4$ decays to $Na_3AlH_6$ and metallic aluminum with release of hydrogen (Equation 4); then, at higher temperatures, there is again release of hydrogen from $Na_3AlH_6$ to form NaH and Al (Equation 5). The overall course of the thermolysis of $NaAlH_4$ is represented in Equation 6. (The dissociation of NaH to Na and hydrogen takes place only at considerably higher temperatures.)

$$NaAlH_4 \rightarrow \tfrac{1}{3}Na_3AlH_6 + \tfrac{2}{3}Al + H_2 \quad (4)$$

$$\tfrac{1}{3}Na_3AlH_6 + \tfrac{2}{3}Al \rightarrow NaH + Al + \tfrac{1}{2}H_2 \quad (5)$$

$$NaAlH_4 \rightarrow NaH + Al + \tfrac{3}{2}H_2 \quad (6)$$

In contrast, the thermolysis of $Na_3AlH_6$ takes place in one step according to Equation 7.

$$Na_3AlH_6 \rightarrow 3NaH + Al + \tfrac{3}{2}H_2 \quad (7)$$

Although the thermal dissociation of $NaAlH_4$ and $Na_3AlH_6$ to NaH, Al and hydrogen (Equations 6 and 7) has been described and the related $H_2$ dissociation pressures experimentally determined (Dymova et al., 1975), the reversibility of this reaction apparently has not been recognized to date. Thus, the decomposition of $NaAlH_4$ to $Na_3AlH_6$ and of the latter to NaH and Al is said to be "irreversible" (Dymova et al., 1975, page 557: " . . . the irreversible decomposition of $NaAlH_4$ leads to $Na_3AlH_6$ which, in its turn, decomposes to NaH."). That the reactions of Equations 6 and 7 are believed to be irreversible can also be seen from the cited article because of the fact that the $H_2$ dissociation pressures have only been measured in the direction of $H_2$ desorption (cf. the text on page 5). In an earlier work by the same group (T. Dymova et al., Dokl. Akad. Nauk SSSR 1974, 215, 1369, Engl. 256, "Direct Synthesis of Alkali Metal Aluminium Hydrides in the Melt"), there is reported, inter alia, a direct synthesis of sodium alanate ($NaAlH_4$) from Na, Al and hydrogen in the molten state (Equation 8) at temperatures below 270–280° C. and pressures above 175 bar. From these references, it can be seen that the reaction mixture is present in liquid form under the conditions of synthesis which should enable an intimate contact between the reactants. Since sodium hydride (NaH) will decompose at about 420° C. without first melting, a synthesis of $NaAlH_4$ from NaH (solid), Al (solid) and $H_2$ is not to be expected from the literature cited.

$$Na(liquid)+Al(solid)+2H_2 \rightarrow NaAlH_4(liquid) \qquad (8)$$

mp. 97.8° C. mp. 187° C.

Therefore, from the prior art, it could not be foreseen or expected that $NaAlH_4$ or $Na_3AlH_6$ could be used as reversible $H_2$ storage materials. However, it has been surprisingly found that the NaH/Al mixtures obtained in active form after the thermolysis of $NaAlH_4$ or $Na_3AlH_6$ (Equations 6 and 7) are rehydrogenated to $NaAlH_4$ or $Na_3AlH_6$, respectively, under certain conditions (Examples 1 and 4). Since the process of thermolysis of sodium alanates with the release of hydrogen and their renewed synthesis with the uptake of hydrogen can be repeated, it is possible to use the sodium alanate/(NaH+Al) systems as reversible $H_2$ storage systems. These are the first known hydrogen storage systems which are based on the reversible reactions of the solid mixtures of a metal hydride (NaH) and a metal (Al) with hydrogen (Equations 9 and 10). To a different extent, this also applies to other alkali metal alanates as defined according to formula 1.

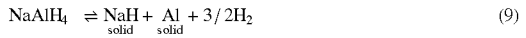

$$NaAlH_4 \rightleftharpoons \underset{solid}{NaH} + \underset{solid}{Al} + 3/2H_2 \qquad (9)$$

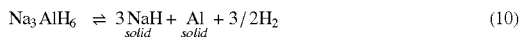

$$Na_3AlH_6 \rightleftharpoons 3\underset{solid}{NaH} + \underset{solid}{Al} + 3/2H_2 \qquad (10)$$

Another inventive feature of the present process is the fact that the process of hydrogen release and uptake by alkali metal alanates can be accelerated or made to proceed more completely by the addition of catalysts. For catalyzing the hydrogen de-charging and charging reactions ($H_2$ desorption and $H_2$ adsorption, respectively), the reversible alkali metal alanates 1 are doped with foreign metal compounds according to the invention. For such doping, alkali metal alanates are reacted or mechanically stirred with foreign metal compounds in an organic solvent or without a solvent. Suitable dopants are compounds of the transition metals of groups three to five of the periodic table (Sc, Y, Ti, Zr, Hf, V, Nb, Ta) as well as compounds of iron, nickel and the rare earth metals (La, Ce, Pr, Nd, Sm, Eu, Gd, Tb, Dy; Ho, Er, Tm, Yb, Lu). Preferred dopants are alcoholates, halides, hydrides and organometallic and intermetallic compounds of the mentioned metals. Combinations thereof may also be employed. The dopants are employed in amounts of from 0.2 to 10 mole %, based on alkali metal alanates 1, preferably in amounts of from 1 to 5 mole %, based on 1. If the transition metals are present in a higher oxidation state, they are reduced to a low-valent oxidation state by the alkali metal alanates, which are present in excess, in the course of the doping process. The reduction process can be detected and quantified by the hydrogen evolution during the doping.

BRIEF DESCRIPTION OF THE DRAWINGS

The invention will now be described in further detail with reference to the drawings wherein.

Figure 1:
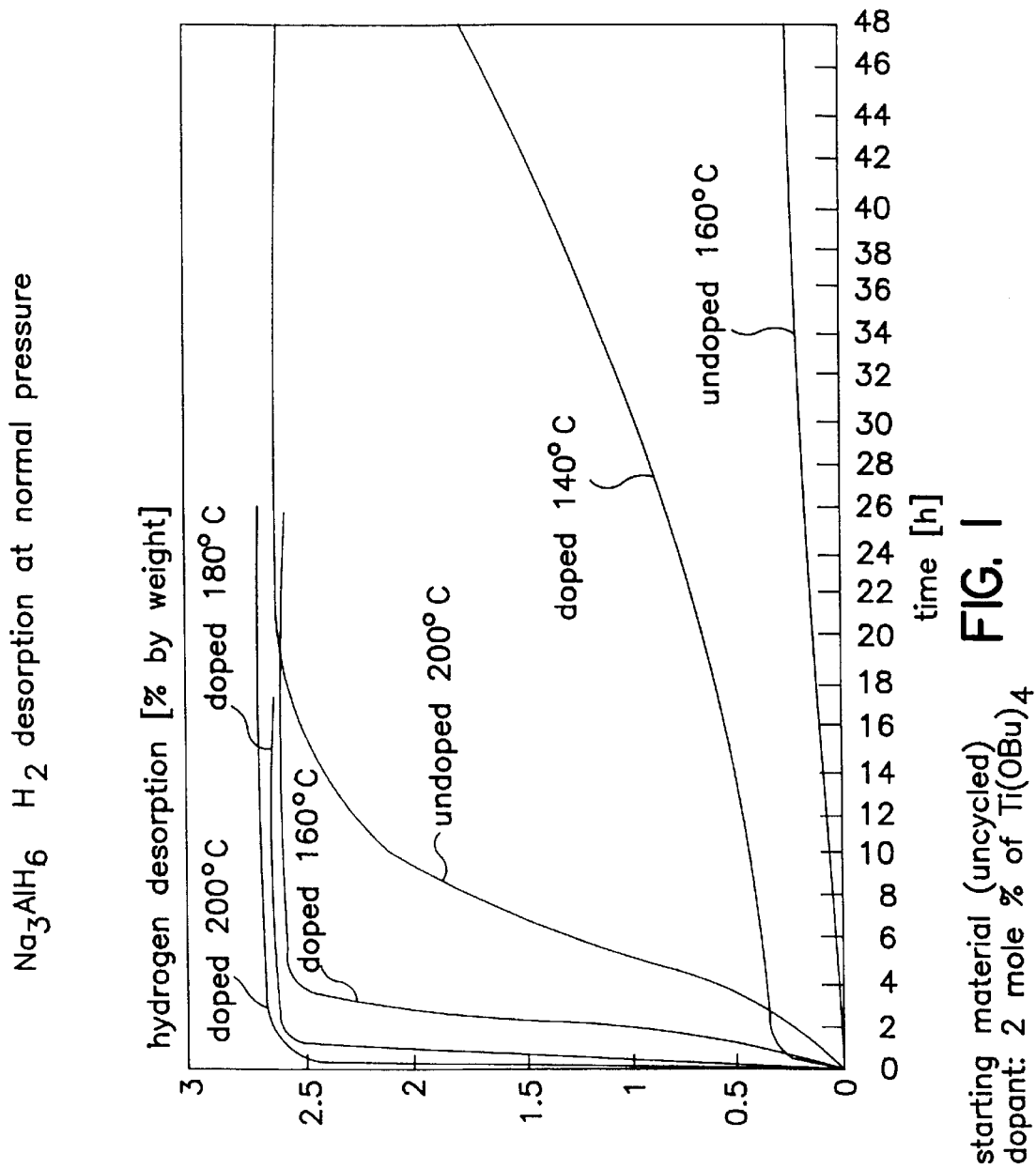
FIG. 1 is a graph depicting $H_2$ desorption from $Na_3AlH_6$ at normal pressure.
Figure 2:
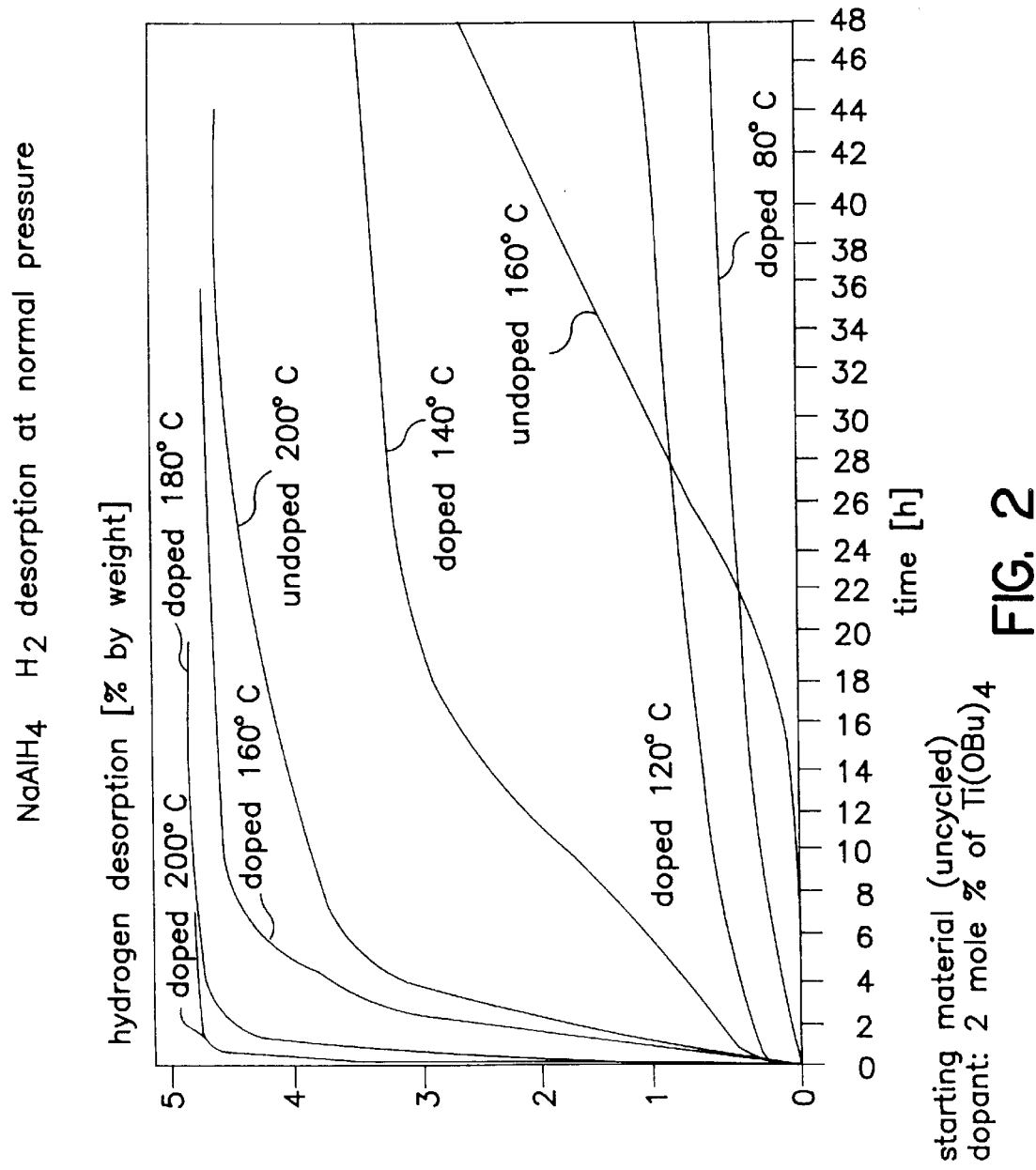
FIG. 2 is a graph depicting $H_2$ desorption from $NaAlH_4$ at normal pressure.

An important feature of metal hydrides as reversible $H_2$ storage materials, e.g., for mobile use, is the rate of hydrogen desorption at different operating temperatures. By the catalytic acceleration of the $H_2$ desorption, the temperature at which the desorption proceeds at a rate which is sufficiently high for technical applications can be considerably lowered. Thus, for example, FIG. 1 (Example 2) shows that undoped $Na_3AlH_6$ will release hydrogen at a hardly remarkable rate at 160° C. Even at 200° C., the dehydrogenation is still relatively slow. In contrast, in $Na_3AlH_6$ doped with 2 mole % of Ti, the desorption proceeds at a nearly constant rate at 160° C. and is virtually completed within 4–5 h already. This is similar with the $H_2$ desorption from undoped as compared to that of Ti doped $NaAlH_4$ (FIG. 2, Example 5).

Figure 3:
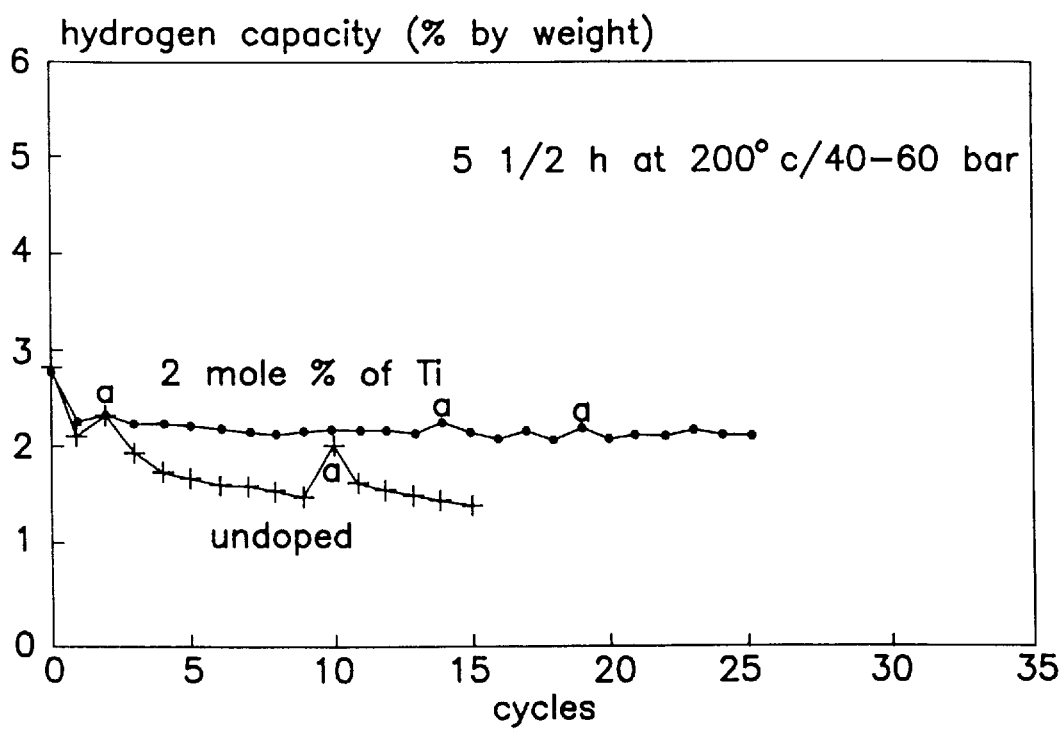
FIG. 3 is a graph depicting $Na_3AlH_6$ cycle stability.

The improvement of $H_2$ absorption performance of the reversible alkali metal alanate $H_2$ storage systems by foreign metal doping can be demonstrated by both the rate and the extent of $H_2$ absorption in a number of dehydrogenation/rehydrogenation cycles (cycle tests). The improvement in $H_2$ uptake of the $Na_3AlH_6/(3 NaH +Al)$ system doped with 2 mole % of Ti in comparison with the corresponding undoped system under the given hydrogenation conditions is shown in FIG. 3 (Example 1). The reversible $H_2$ content of the Ti doped system is significantly higher than that of the undoped system; in addition, the Ti doped $Na_3AlH_6$ shows a higher cycle stability as compared to the undoped material.

A dramatic increase in $H_2$ absorptivity of the reversible $NaAlH_4/(NaH+Al)$ system results from Ti doping, e.g., with 2 mole % of $TiCl_3$. In a typical cycle test (FIG. 4, Example 4), the reversible $H_2$ content of the doped sample is from 3.1 to 4.2% by weight while the undoped sample will store only from 0.5 to 0.8% by weight of hydrogen under the same hydrogenation conditions.

Figure 5:
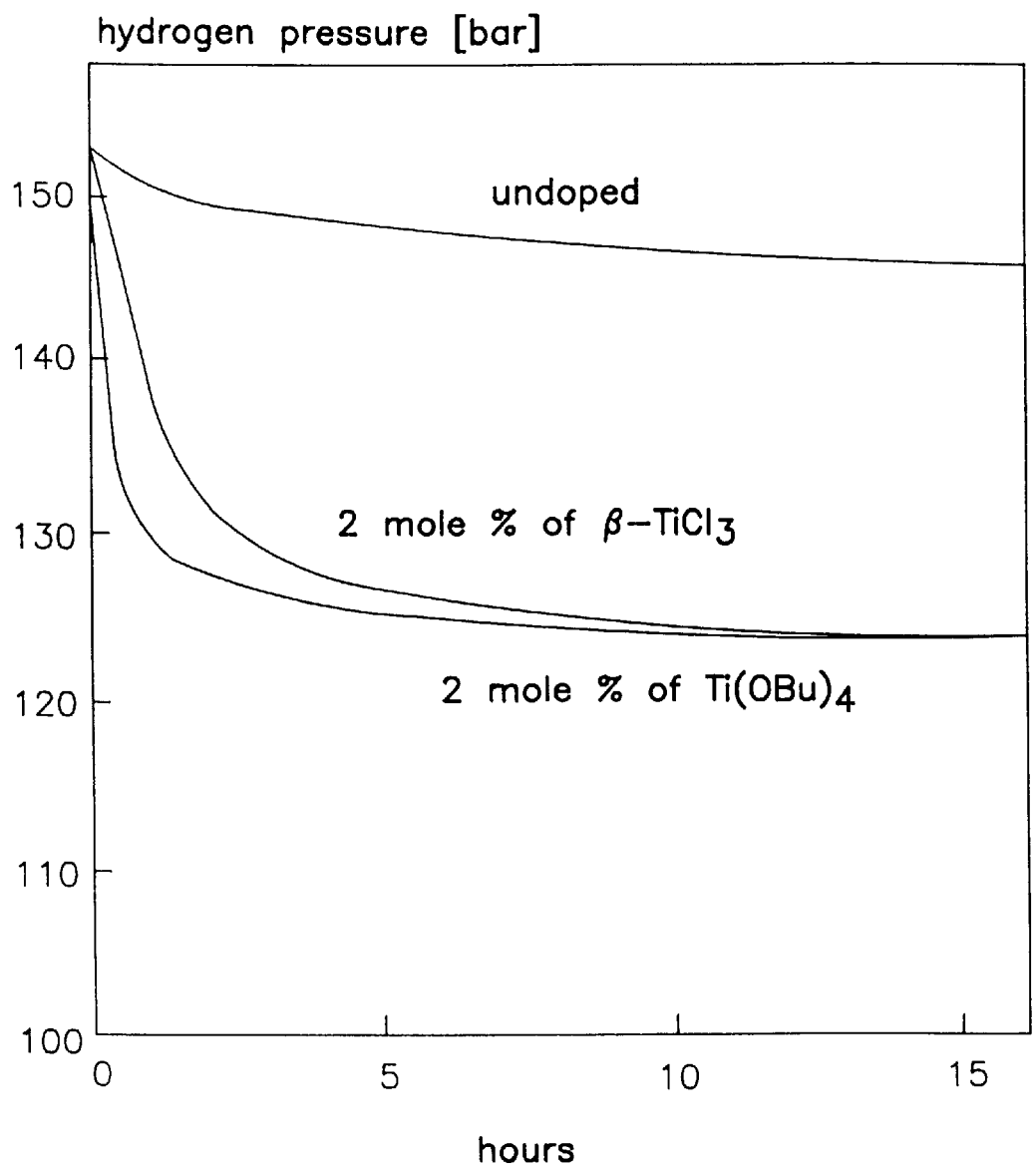
FIG. 5 is a graph depicting hydrogen charging of dehydrogenated sodium alanate at 170°C.

The improvement of the rate and extent of $H_2$ absorption of the reversible $NaAlH_4/(NaH+Al)$ system by Ti doping can be demonstrated particularly clearly by the hydrogenation curves in FIG. 5 (Example 5); as shown in the figure, the NaH+Al mixture obtained from the dehydrogenation of $NaAlH_4$ doped with $Ti(OBu)_4$ can be hydrogenated to $NaAlH_4$ at 170° C./152–125 bar substantially more rapidly than the $TiCl_3$ doped material. The degree of rehydrogenation after 15 h under these conditions is 3.9% by weight of $H_2$ with both $Ti(OBu)_4$ and $TiCl_3$ doping. Under the same hydrogenation conditions, a degree of rehydrogenation of only 0.8% by weight of $H_2$ is achieved with the undoped $NaAlH_4$ (Example 4).

Figure 6:
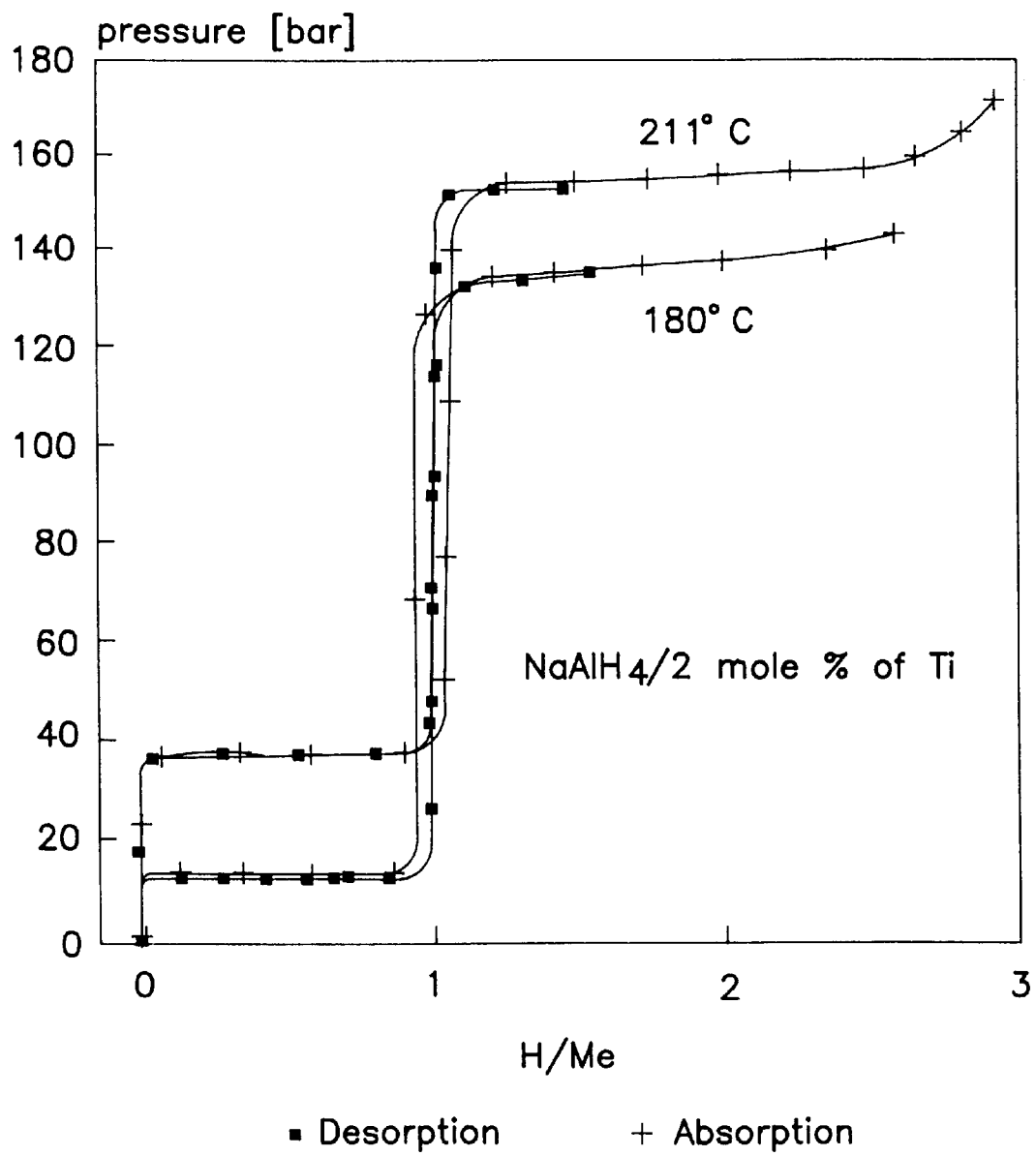
FIG. 6 is a graph depicting the experimentally established concentration-pressure isotherms of the $NaAlH_4/(NaH+Al)$ system doped with 2 mole % of Ti at 180°C. and 211°C.
Figure 7:
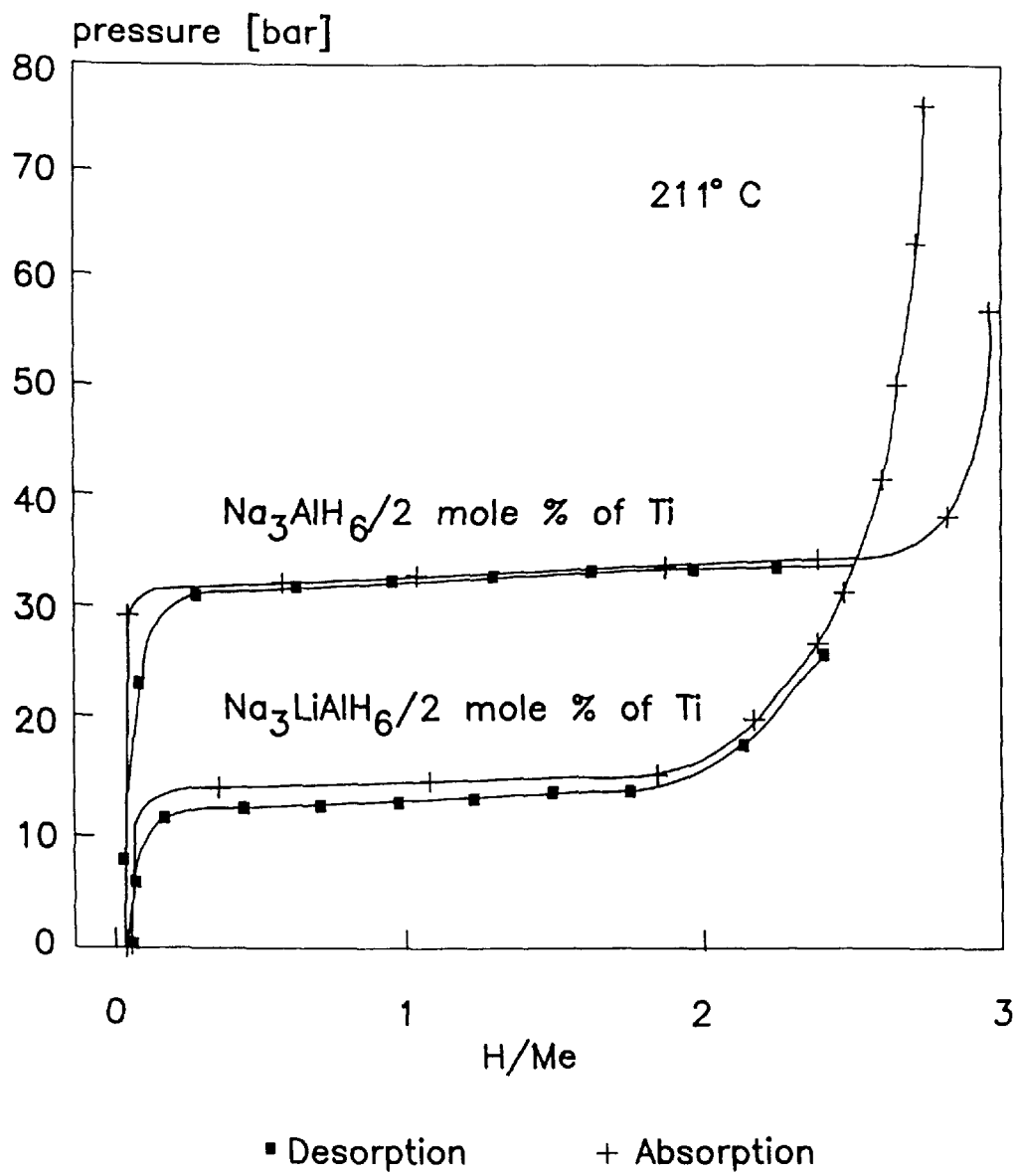
FIG. 7 is a graph depicting the experimentally established concentration-pressure isotherms of the $Na_3AlH_6/(3 NaH+Al)$ and $Na_2LiAlH_6/(2 NaH+LiH+Al)$ system doped with 2 mole % of Ti at 211°C..

The evaluation of the reversible metal hydride/metal systems with respect to their maximum achievable $H_2$ storage capacity as well as the conditions under which hydrogen charging and decharging is possible under principal (thermodynamic) aspects is generally performed by so-called concentration-pressure isotherms (cpi diagrams). The experimentally established cpi diagrams of the $NaAlH_4$/(NaH+Al) system doped with 2 mole % of Ti (Example 4) at 180 and 211° C. are shown in FIG. 6, and those of the Ti doped $Na_3AlH_6$/(3 NaH+Al) and $Na_2LiAlH_6$/(2 NaH+LiH+Al) systems (Examples 1 and 3) at 211° C. are shown in FIG. 7. As shown in the Figures, the cpi diagrams of the hydride systems according to the invention could be established in the direction of both $H_2$ desorption and $H_2$ absorption, which furnishes evidence for their usefulness in reversible $H_2$ storage and disproves the assumption of irreversibility of the thermal decomposition of $NaAlH_4$ and $Na_3AlH_6$ found in the cited literature (text on page 3).

In the cpi diagram of the $NaAlH_4$/(NaH+Al) system (FIG. 6), two temperature-dependent pressure plateaus can be seen which correspond to the two-step dissociation of $NaAlH_4$ (Equations 4 and 5). In contrast, the cpi diagram of the $Na_3AlH6$/(3 NaH+Al) system (FIG. 7) shows only one pressure plateau, in accordance with the one-step reversible dissociation of $Na_3AlH_6$ (Equation 7). From the broadness of the pressure plateaus, it can be seen that the Ti doped $NaAlH_4$/(NaH+Al) system (FIG. 6) disposes of a maximum achievable $H_2$ storage capacity of 3.2% by weight through the first dissociation step, of 1.7% by weight through the second, and of 4.9% by weight of $H_2$ through the two dissociation steps. In the cycle tests performed (FIG. 4, Example 3), storage capacities of up to 4.1% by weight of $H_2$ are achieved through the two dissociation steps, depending on the hydrogenation condition. The Ti doped $Na_3AlH_6$/(3 NaH+Al) system (FIG. 7) disposes of a maximum storage capacity of 2.7% by weight of $H_2$, and in cycle tests (FIG. 3, Example 1), up to 2.3% by weight of $H_2$ is achieved. Thus, the reversible $NaAlH_4$/(NaH+Al) system is distinguished from the $Na_3AlH_6$/(3 NaH+Al) system by a substantially higher reversible $H_2$ storage capacity. This goes along with the drawback that the former system requires relatively high hydrogen pressures (e.g., 130–150 bar) for charging with hydrogen (e.g., at 170° C.; Example 4, FIG. 4), which is due to the high $H_2$ equilibrium pressure (FIG. 6). In contrast, it is characteristic of the $Na_3AlH_6$/(3 NaH+Al) system that charging with hydrogen can be done under substantially lower hydrogen pressures (e.g., 40–60 bar at 200° C.; Example 1, FIG. 3) due to the relatively low $H_2$ equilibrium pressure (FIG. 7; 32–34 bar at 211° C.).

The conditions for hydrogen charging and hydrogen decharging of the alkali metal alanate systems according to the invention (e.g., Equations 9 and 10) at a particular temperature are governed by the thermodynamically caused and experimentally determinable hydrogen equilibrium pressures (FIGS. 6 and 7). If the external $H_2$ pressure exceeds the hydrogen equilibrium pressure and the system is in an uncharged or partially charged condition, $H_2$ absorption occurs. Conversely, if the external $H_2$ pressure is lower than the hydrogen equilibrium pressure and the system is in a charged or partially charged condition, $H_2$ desorption occurs. For the rate of $H_2$ absorption or $H_2$ desorption to attain a finite value, the temperature at which the $H_2$ charging or $H_2$ decharging occurs must not be lower than ~100° C. For hydrogen charging at a given temperature, external $H_2$ pressures of from 0.1 to 100 bar above the hydrogen equilibrium pressure, preferably from 2–3 to 50 bar above the hydrogen equilibrium pressure, are to be used.

For hydrogen decharging, external $H_2$ pressures of from 0.1 bar below the hydrogen equilibrium pressure to 0.1 bar, preferably from 2–3 bar below the hydrogen equilibrium pressure to ~1 bar, are to be used.

Of particular interest is the cpi diagram of the Ti doped $Na_2LiAlH_6$/(2 NaH+LiH+Al) system (FIG. 7, Example 3) which also has only one well pronounced pressure plateau at 211° C. which is shifted by about 20 bar towards lower pressure as compared to that of the $Na_3AlH_6$/(3 NaH+Al) system. The presence of only one pressure plateau different from that of $Na_3AlH_6$ in the cpi diagram of $Na_2LiAlH_6$ clearly demonstrates that this is an as yet unknown reversible metal hydride system, having a maximum $H_2$ storage capacity of 2.9% by weight (up to 2.7% by weight of $H_2$ achievable in practice), rather than a mixture of $Na_3AlH_6$ and $Li_3AlH_6$. In addition, it can be seen from this diagram that a well-aimed, "tailor-made" change of the reversible $H_2$ dissociation pressure, i.e., the thermodynamic properties of the present hydride system, is possible by a partial substitution of the sodium in $Na_3AlH_6$ by lithium. Such well-aimed changes of the thermodynamic parameters by partial exchange of a metal component have been possible to date, in particular, with the reversible metal hydride system, $LaNi_5H_6/LaNi_5$. They are of technical importance, inter alia, due to the fact that the combination of two or more of such metal hydrides having different $H_2$ dissociation pressures is the basis for the function of metal hydride heat pumps (Sandrock 92, pages 234–237).

In addition, the cpi diagrams of all the three systems studied (FIGS. 6 and 7) exhibit two other features of these systems which are important in view of technical applications, namely the absence of hysteresis effects (the $H_2$ absorption curves are identical with those of $H_2$ desorption), and the almost horizontal course of the $H_2$ pressure plateaus. The absence of hysteresis effects means that no immanent losses of pressure and thus energy occur in the hydrogen charging and hydrogen decharging of these systems. The consequence of the horizontal course of the $H_2$ pressure plateaus is that hydrogen charging and hydrogen decharging can proceed at a constant hydrogen pressure in the gas volume when the hydride bed is at a constant temperature.

The dependence of the $H_2$ dissociation pressure on the temperature of the Ti doped $NaAlH_4$ (Equation 4) and $Na_3AlH_6$ (Equation 7) systems was experimentally established using the cpi diagrams at 180 and 211° C. (Examples 1 and 4). By reason of the $H_2$ dissociation pressures, the first dissociation step of the Ti doped $NaAlH_4$ system is to be classified as a so-called low temperature hydride system, and the second as a medium temperature hydride system (Buchner, 1982, pages 26–29). Thus, the two-step reversible Ti doped metal hydride system $NaAlH_4$/(NaH+Al) (Equation 6) consists of a low temperature and a medium temperature hydride step. The present invention for the first time provides reversible low and medium temperature hydride systems based on the light metals Na, Li and Al. Their reversible $H_2$ capacities are theoretically and practically higher than those of the as yet known low and medium temperature hydrides (cf. page 2).

The reversible alkali metal alanates according to the invention are suitable as hydrogen storage systems for mobile and stationary use. Their technical advantages as compared to high temperature hydrides, such as $MgH_2$, are their substantially reduced operating temperatures (e.g., 150° C. instead of $\geq 300°$ C.), and as compared to low temperature hydrides, their higher $H_2$ storage capacities and lower estimated material costs. Due to the relatively low reaction enthalpy of the alkali metal alanates (see above) and their low operating temperatures, it is considered that, when used as $H_2$ storage materials for, e.g., fuel cells or combustion engines, the hydrogen consumer can supply enough waste heat on a temperature level required for the desorption of the hydrogen from the alanate. Thus, for example, the operating temperature of the phosphoric acid fuel cell, i.e., 160° C., is within this temperature range (cf. J. Bentley et al., Proc. Intersoc. Energy Convers. Eng. Conf. 1994, 29th, 1103). Another advantage for driving fuel cells is the high purity of the hydrogen desorbed from the alanate, such as, in particular, the absence of carbon monoxide.

For increasing the total energy density, alkali metal alanates as $H_2$ storage materials can be combined with magnesium hydride storage materials in a number of different ways. In addition, they may serve, if appropriate, as intermediate $H_2$ storage materials in the $MgH_2/Mg$ based high temperature heat storage (cf. A. Ritter, VGB Kraftwerkstechnik (Engl. ed.) 1992, 72, 311).

The invention is further illustrated by the following Examples without being limited thereto. All experiments with air-sensitive substances were performed under a protective atmosphere, e.g., argon. The solvents employed were free from air and water.

EXAMPLE 1

($Na_3AlH_6$ and $\beta$-$TiCl_3$ doped $Na_3AlH_6$ as reversible $H_2$ storage materials)

$Na_3AlH_6$ was prepared from $NaAlH_4$ and NaH in heptane by the method of Zakharkin et al. (Dokl. Akad. Nauk SSSR, Engl. ed. 1962, 145, 656). Commercially available $NaAlH_4$ was purified by dissolving in THF and precipitating with ether (Clasen, Angew. Chem. 1961, 73, 322). After drying in vacuo, the crystalline $NaAlH_4$ obtained showed very broad hydride bands in the infrared (IR) spectrum (KBr) in the region around 720, 900 and 1670 $cm^{-1}$; bands from complexed THF or ether are not present in the spectrum. Elemental analysis (calculated values for $NaAlH_4$): Na 42.71 (42.75); Al 49.46 (49.96); H 7.62 (7.47); C 0.28 (0.0) %. The alcoholysis of $NaAlH_4$ yielded 99.3% of the calculated quantity of hydrogen.

16.57 g (0.31 mol) of the purified $NaAlH_4$ and 14.87 g (0.62 mol) of NaH (Fluka) were suspended in 120 ml of n-heptane, and the suspension was intensely stirred in an autoclave at an $H_2$ pressure of 140 bar and at 162° C. (inside temperature) for 72 h. $Na_3AlH_6$ was separated from the solvent by filtration, washed with pentane and dried in vacuo to obtain 30.90 g of a fine light grey powder. $Na_3AlH_6$ was identified by X-ray powder diffraction analysis and IR spectroscopy (KBr; very broad bands at 500–1000 and around 1300 $cm^{-1}$; the band at ~1700 $cm^{-1}$, see above, is absent) Elemental analysis of $Na_3AlH_6$ (calculated values): Na 67.27 (67.62); Al 26.15 (26.45); H 5.84 (5.93); C 0.88 (0.0) %. The thermovolumetric analysis of an ~1 g sample (4° C./min up to 270° C.; Chem. Ing. Tech. 1983, 55, 156) yielded 96% of the hydrogen quantity calculated for the dissociation to 3 NaH+Al (Equation 7).

For doping with titanium, 15.99 g (157 mmol) of $Na_3AlH_6$ was mixed with 0.48 g (3.1 mol) of $\beta$-$TiCl_3$, and 30 ml of ether was added thereto. The stirred suspension immediately adopted a deep brown colour, and $H_2$ evolution started. When the $H_2$ evolution was complete (40 min), the stirred suspension had liberated 110 ml (4.6 mmol) of $H_2$. The ether was evaporated in vacuo, and the residue was dried in vacuo to obtain 16.46 g of Ti doped $Na_3AlH_6$ as a brown, air-sensitive powder the IR spectrum of which corresponded to that of $Na_3AlH_6$ (see above). Elemental analysis (calculated values): Na 65.92 (65.63); Al 24.75 (25.68); H 5.28 (5.76); Ti 1.28 (0.91); Cl 1.86 (2.02); C 0.74 (0.0) %. Thermovolumetric analyses (see above) performed up to 270° C. and 500° C. yielded 97% and 98%, respectively, of the hydrogen quantity calculated for the dissociation to 3 NaH+Al and to 3 Na+Al, respectively. The thermovolumetric curve of Ti doped $Na_3AlH_6$ to 3 NaH +Al is shifted by about 50° C. towards lower temperatures as compared to that of pure $Na_3AlH_6$.

In order to test their suitability as reversible $H_2$ storage materials, 2.6 g samples each of pure and Ti doped $Na_3AlH_6$ were subjected to a number of dehydrogenation/rehydrogenation cycles (cycle tests) under the same conditions. The cycle tests in this example were performed in a so-called open system, i.e., fresh hydrogen (technical hydrogen, 99.9%) was taken from a hydrogen pressure tank in each hydrogenation, and hydrogen was desorbed against normal pressure in each dehydrogenation.

Dehydrogenation: The sample is heated at 4° C./min from room temperature to 270° C., and then the temperature is kept constant until the $H_2$ evolution is complete; the time course of $H_2$ evolution together with the inside temperature of the sample can be recorded with the aid of an automatic gas burette (Chem. Ing. Tech. 1983). The hydrogenation is performed for 5½ h at 200° C. while the $H_2$ pressure in the autoclave decreases from 60 to ~40 bar.

The dependence of hydrogen storage capacity (measured through the quantity of hydrogen released during the dehydrogenation) on the number of cycles of pure and Ti doped $Na_3AlH_6$ is shown in FIG. 3. Under the stated conditions, the reversible $H_2$ content of the Ti doped $Na_3AlH_6$/(3 NaH+Al) system is from 2.1 to 2.5% by weight (theoretical $H_2$ content: 2.84% by weight) which is significantly higher than that of undoped $Na_3AlH_6$. In addition, the Ti doped $Na_3AlH_6$ exhibits a considerably better cycle stability than pure $Na_3AlH_6$.

EXAMPLE 2

(pure and $Ti(OBu)_4$ doped $Na_3AlH_6$ as reversible $H_2$ storage materials; rate of $H_2$ desorption as a function of temperature; 100 cycle test)

9.58 g (94 mmol) of $Na_3AlH_6$ (Example 1) was suspended in 30 ml of ether, and 0.64 ml (1.9 mmol, 2 mole %) of titanium tetra-n-butylate ($Ti(OBu)_4$) was added to the suspension with stirring (with a syringe through a septum). The amount of $H_2$ evolved (cf. Example 1) was 93 ml (2.1 $H_2$/Ti). After evaporating the ether in vacuo, 10.13 g of Ti doped $Na_3AlH_6$ remained.

For characterizing their usefulness as reversible $H_2$ storage materials, the rates of $H_2$ desorption of pure and of Ti doped $Na_3AlH_6$ were measured at temperatures of 140, 160, 180 and 200° C. To this end, 1.75 g each of the alanate samples contained in glass vessels were placed in an oven preheated to the respective temperature, and the time course of the $H_2$ evolution was recorded with the aid of an automatic gas burette connected with the glass vessel (Chem. Ing. Tech. 1983; see FIG. 1). As can be seen from FIG. 1, the Ti doping causes a dramatic improvement of the $H_2$ desorptivity of $Na_3AlH_6$.

Another sample (7.41 g) of the $Na_3AlH_6$ doped with 2 mole % of $Ti(OBU)_4$ (see above) was subjected to 100 cycles of a dehydrogenation/rehydrogenation test in a closed system. The sample (which had been preliminarily pressed into tablets of about 1.0 g/ml) was placed in a 45 ml autoclave which was connected to a 100 ml pressure tank via a capillary. At specified time intervals, the autoclave was alternately heated at 230° C. for 1¼ h for dehydrogenation and maintained at 170° C. for varying periods of time for rehydrogenation. The variation of $H_2$ pressure in the system in the range between 30 and 42 bar was recorded on a two-channel plotter with the aid of a pressure/voltage converter together with the temperature of the autoclave. Through the pressure variation in the system, the reversible $H_2$ capacity of the sample could be determined to be 1.64–1.83 and 1.79–2.06% by weight in the 100 cycle test for hydrogenation times of 1¼ and 4½ h, respectively.

Example 3

($\beta$-$TiCl_3$ doped $Na_2LiAlH_6$ as a reversible $H_2$ storage material)

$Na_2LiAlH_6$ was prepared by reacting $NaAlH_4$ with $NaH$ and $LiH$ in a molar ratio of 1:1:1 in n-heptane. From 6.79 g (126 mmol) of $NaAlH_4$, 3.04 g (127 mmol) of $NaH$ and 0.97 g (122 mmol) of $LiH$ in 90 ml of n-heptane, there was obtained 11.08 g of $Na_2LiAlH_6$ as a fine light grey powder in analogy to Example 1. The IR spectrum of the $Na_2LiAlH_6$ corresponded to that of $Na_3AlH_6$ (Example 1; there were no IR spectroscopic indications of $NaH$, $LiH$ or $NaAlH_4$). Elemental analysis (calculated values for $Na_2LiAlH_6$): Na 53.98 (53.50); Al 29.87 (31.39); Li 7.88 (8.08); H 6.50 (7.04); C 1.56 (0.0) %. A thermovolumetric analysis (cf. Example 1) performed up to 500° C. yielded 98% of the hydrogen quantity calculated for the dissociation to 2 Na+LiH+Al.

5.87 g (68 mmol) of $Na_2LiAlH_6$ was doped with 2 mole % (1.4 mmol, 0.22 g) of $\beta$-$TiCl_3$ in ether as described in Example 1. The amount of $H_2$ evolved upon doping was 2.1 mmol. Elemental analysis of the 6.03 g of Ti doped $Na_2LiAlH_6$ obtained (calculated values in parentheses): Na 51.06 (51.64); Al 30.17 (30.30); Li 7.59 (7:80); H 5.96 (6.79); Ti 1.05 (1.08); Cl 2.46 (2.39); C 1.71 (0.0) %. The cpi. diagram of the Ti doped $Na_2LiAlH_6$ at 211° C. is shown in FIG. 7. Ti doped $Na_2LiAlH_6$ was subjected to a 28 cycle test under the same conditions as those used in Example 1. As shown in FIG. 9, the reversible $H_2$ content of this system is between 2.10 and 2.51% by weight. With a hydrogenation time of 16 h, an $H_2$ capacity of up to 2.7% by weight can be achieved.

EXAMPLE 4

($NaAlH_4$ and $\beta$-$TiCl_3$ doped $NaAlH_4$ as reversible $H_2$ storage materials)

26.83 g (0.50 mol) of the purified $NaAlH_4$ (Example 1) was doped with 2 mole % (10.2 mmol, 1.58 g) of $\beta$-$TiCl_3$ in 150 ml of ether as described in Example 1. The amount of $H_2$ evolved upon doping was 14.6 mmol, from which a reduction of titanium to the zero-valent state can be concluded. Elemental analysis of the 28.33 g of Ti doped $NaAlH_4$ obtained (calculated values): Na 41.80 (40.27); Al 46.81 (47.26); H 6.95 (7.06); Ti 1.46 (1.68); Cl 2.79 (3.73); C 0.20 (0.0) %. The IR spectrum of the Ti doped $NaAlH_4$ corresponded to that of pure $NaAlH_4$ (Example 1). Thermovolumetric analyses (cf. Example 1; 4° C./min) performed up to 200, 270 and 500° C. yielded 104, 96% and 97%, respectively, of the hydrogen quantity calculated for the dissociation to ⅓ $Na_3AlH_6$+⅔Al (detected by IR and X-ray powder diffraction analysis), NaH+Al (X-ray powder diffraction analysis) and Na+Al, respectively. The thermovolumetric curve of Ti doped $NaAlH_4$ up to 200° C. is shifted by 85° C. towards lower temperatures as compared to that of pure $NaAlH_4$.

Figure 4:
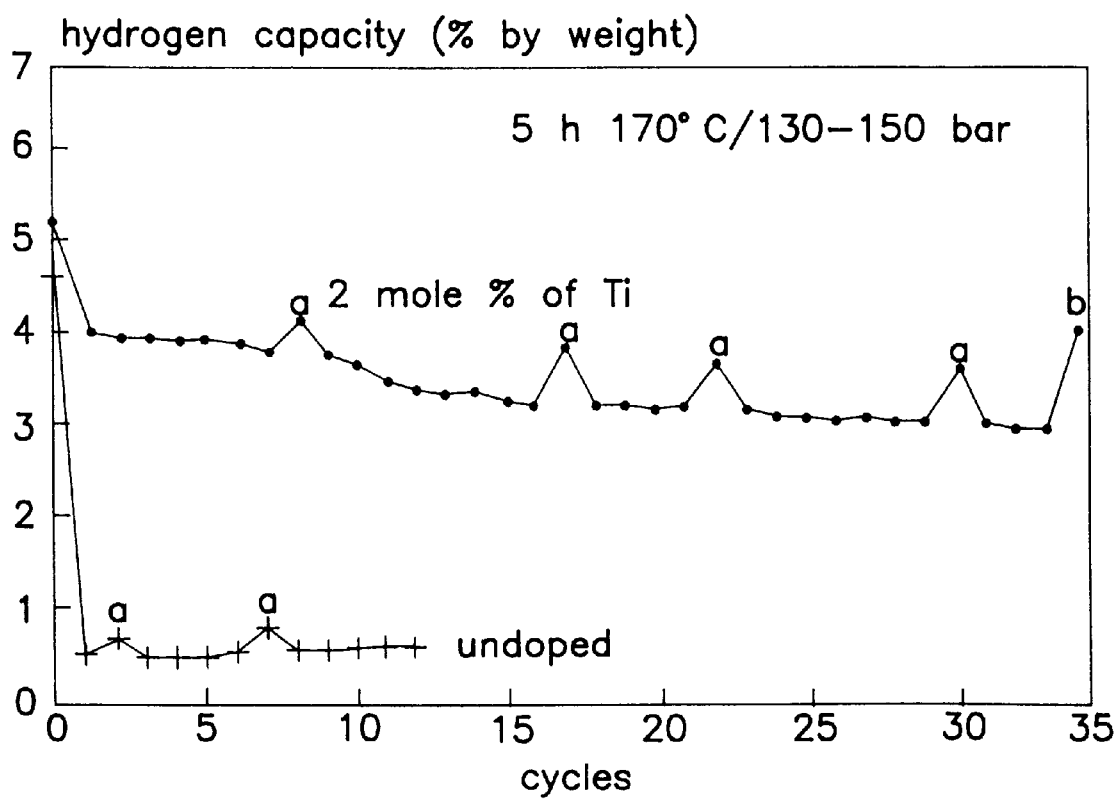
FIG. 4 is a graph depicting $NaAlH_4$ cycle stability.

The course of the cycle tests, performed on samples (2.4 g) of pure and of Ti doped $NaAlH_4$ under different hydrogenation conditions (dehydrogenation performed as in Example 1), is shown in FIG. 4. The cpi diagram of Ti doped $NaAlH_4$ is shown in FIG. 6.

EXAMPLE 5

($Ti(OBu)_4$ doped $NaAlH_4$ as a reversible $H_2$ storage material)

The doping of $NaAlH_4$ with $Ti(OBu)_4$ in ether was performed in analogy to Example 2. There was employed 10.96 9 (203 mmol) of purified $NaAlH_4$ (Example 1), 25 ml of ether, and 1.39 ml of $Ti(OBu)_4$ (2 mole %). The amount of hydrogen evolved was 205 ml (2.1 $H_2$/Ti). After drying in vacuo, 12.40 g of the Ti doped $NaAlH_4$ was obtained. The determination of the rate of $H_2$ desorption on samples (1.35 9) of the Ti doped and undoped $NaAlH_4$ at different temperatures was performed as in Example 2. The measuring results (FIG. 2) show, inter alia, that the Ti doped $NaAlH_4$ supplies 4.5% by weight of $H_2$ within a few hours at 160° C. already.

Another sample of purified $NaAlH_4$ (2.42 g, 44.8 mmol) was doped with 2 mole % of $Ti(OBu)_4$ as described in Example 2, but using pentane (10 ml) as the solvent instead of ether. After stirring the mixture at room temperature for one hour, the evolution of 42 ml of gas was observed. After evaporating the solvent and drying the residue in vacuo, 2.61 g of Ti doped $NaAlH_4$ remained in the form of a brown powder. When thermolysed (up to 270° C., cf. Example 1), it yielded 1.56 1 of $H_2$ (20° C./1 bar), corresponding to 5.0% by weight of $H_2$. The course of the rehydrogenation of the solid thus obtained at 170° C./152 bar of $H_2$ (initial pressure) in comparison with the rehydrogenation of the correspondingly thermolyzed samples of $NaAlH_4$ doped with 2 mole % of $\beta$-$TiCl_3$ and of undoped $NaAlH_4$ (Example 4) is shown in FIG. 5. After 15 h under the stated conditions, the sample doped with Ti(OBu) 4 achieved a degree of rehydrogenation of 78% (3.9% by weight of $H_2$). The corresponding values for the $\beta$-$TiCl_3$ doped and the undoped samples are 78% (3.9) and 15% (0.8%), respectively.

EXAMPLE 6

($Ti(OBu)_4$ doped $NaAlH_4$ as a reversible $H_2$ storage material; doping without a solvent)

2.34 g (43.3 mmol) of the purified $NaAlH_4$ (Example 1) in solid form was whirled up with a magnetic stirring bar, and 0.30 ml (0.88 mmol) of titanium tetrabutylate was added with a syringe through a septum. The initially white sodium alanate was turned light brown thereby, and evolution of 24 ml of hydrogen (=2.3 H/Ti) occurred within 40 min. Subsequently, 2.49 g of this material was employed as a reversible hydrogen storage material. Thermolysis up to 270° C. (cf. Example 1) yielded 1.46 1 of $H_2$ (20° C./1 bar), corresponding to 4.9% by weight. The residue was rehydrogenated at 170° C. and between 143 and 120 bar within 15 h and again subjected to thermolysis as above. The reversible $H_2$ content was 3.6% by weight, corresponding to a degree of rehydrogenation of 74%.

EXAMPLES 7–25

1.3 g portions of the purified $NaAlH_4$ (Example 1) were each suspended in 20 ml of ether, and to the stirred suspension was added 5 mole % (based on $NaAlH_4$) of the respective metal compound. After 20–60 min (completion of the $H_2$ evolution), the solvent was evaporated, and the residues dried in vacuo. They were subjected to a thermolysis up to 270° C. as described in Example 1, and the $H_2$ volumes evolved were determined (Table 1, column "1st thermolysis"). The solids were then hydrogenated in an autoclave at 120° C. and 150 bar (initial pressure) to a minimum of 130 bar of $H_2$ pressure for 24 h, and subsequently again thermolyzed up to 270° C. The ratios of the $H_2$ volumes of the 2nd to those of the 1st thermolyses (in %) yield the degrees of rehydrogenation stated in Table 1.

EXAMPLE 26

(Ti(OBu)$_4$ and LaNi$_5$ doped NaAlH$_4$ as a reversible H$_2$ storage material)

A sample of the purified (Example 1) NaAlH$_4$ (1.87 g, 34.6 mmol) in solid form was stirred with 380 mg (17% by weight) of LaNi$_5$ powder (Alfa, 99.5%) and then doped with 2 mole % of Ti(OBu)$_4$ in 20 ml of ether as described in Example 2. The amount of hydrogen evolved was 34.6 ml (2.1 H$_2$/Ti). After evaporating the ether and drying in vacuo, 2.48 g of the LaNi$_5$ and Ti(OBu)$_4$ doped NaAlH$_4$ was obtained. Thermolysis up to 270° C. (as in Example 1) yielded 4.1% by weight of H$_2$. After hydrogenating the dehydrogenated sample (120° C./110–90 bar of H$_2$/24 h), an H$_2$ content of 3.1% by weight was found upon renewed thermolysis up to 270° C., corresponding to a degree of rehydrogenation of 76%. In comparison, a sample of NaAlH$_4$ which was doped with Ti(OBu)$_4$ only (Example 5) showed a degree of rehydrogenation of only 60% under the same conditions.

TABLE 1

Degrees of rehydrogenation[a] of dehydrogenated NaAlH$_4$ as a function of the dopant

| Ex. No. | dopant[b] | 1st thermo-lysis[c] [% by weight of H$_2$] | 2nd thermo-lysis[c] [% by weight of H$_2$] | degree of rehydro-genation [%] |
|---|---|---|---|---|
| 7 | — | 5.52 | 0.55 | 10 |
| 8 | TiCl$_4$ | 4.51 | 2.85 | 63 |
| 9 | β-TiCl$_3$ | 4.75 | 2.96 | 62 |
| 10 | HTiCl.0.5THF | 5.00 | 3.07 | 61 |
| 11 | Ti(OBu)$_4$ | 4.23 | 2.60 | 61 |
| 12 | Cp$_2$TiCl$_2$ | 4.48 | 2.34 | 52 |
| 13 | ZrCl$_4$ | 4.71 | 2.59 | 55 |
| 14 | Cp$_2$ZrCl$_2$ | 4.40 | 2.89 | 66 |
| 15 | VCl$_3$ | 4.81 | 2.65 | 55 |
| 16 | Cp$_2$VCl$_2$ | 4.47 | 2.11 | 47 |
| 17 | NbCl$_3$ | 4.59 | 1.91 | 42 |
| 18 | YCl$_3$ | 4.59 | 2.20 | 48 |
| 19 | LaCl$_3$ | 4.56 | 2.62 | 57 |
| 20 | CeCl$_3$ | 4.53 | 2.47 | 54 |
| 21 | PrCl$_3$ | 4.51 | 2.64 | 59 |
| 22 | NdCl$_3$ | 4.54 | 3.10 | 68 |
| 23 | SmCl$_3$ | 4.42 | 2.77 | 63 |
| 24 | FeCl$_2$ | 4.65 | 2.13 | 46 |
| 25 | NiCl$_2$:1.5THF | 4.69 | 2.24 | 48 |

[a]hydrogenation conditions: 120° C./150-130 bar of H$_2$/24 h.
[b]5 mole % each, based on NaAlH$_4$.
[c]form room temperature to 270° C. at 4° C./min; then 270° C. until the H$_2$ evolution was completed.

EXAMPLE 27

(TiCl$_4$ doped KAlH$_4$ as a reversible H$_2$ storage material)

2.46 g of KAlH$_4$ (35.1 mmol) was suspended in 20 ml of ether, and 0.1 ml of TiCl$_4$ (0.91 mmol=2.6 mole %) of TiCl$_4$ was added to the stirred suspension; spontaneous gas evolution occurred. The amount of hydrogen evolved was about 200 ml. After evaporating the ether in vacuo, 2.65 g of the TiCl$_4$ doped KAlH$_4$ was obtained in the form of a black powder. Thermolysis up to 320° C. yielded 2.4% by weight of H$_2$. After hydrogenating the dehydrogenated sample (140° C./150–140 bar/18 h), an H$_2$ content of 0.8% by weight was found upon renewed thermolysis up to 320° C., corresponding to a degree of rehydrogenation of 32.5%.

We claim:
1. A process for the reversible storage of hydrogen, said process comprising:
   a) dehydrogenating a complex alkali metal aluminum hydride of the formula (1):

$$M^1_{p(1-x)}M^2_{px}AlH_{3+p} \quad (1)$$

wherein
M$^1$ is selected from the group consisting of Na and K;
M$^2$ is selected from the group consisting of Li and K;
$0 \leq x \leq 0.8$; and
$1 \leq p \leq 3$;
to yield hydrogen gas and at least one other product; and
   b) hydrogenating said other product to yield said complex alkali metal aluminum hydride of the formula (1);
wherein steps a) and b) are carried out in any order.

2. The process according to claim 1, wherein steps a) and b) are catalyzed.

3. The process according to claim 2, wherein steps a) and b) are catalyzed by a process comprising doping the alkali metal aluminum hydride of the formula (1) by reacting or stirring the alkali metal aluminum hydride of the formula (1) with a dopant comprising a metal selected from the group consisting of transition metals of Groups III to V of the periodic table, iron, nickel and the rare earth metals, or a combination of said metals.

4. The process according to claim 3, wherein said dopant is selected from the group consisting of alcoholates, halides, hydrides and organometallic and intermetallic compounds of said metal or combination of metals.

5. The process according to claim 3, wherein the doping is performed in an organic solvent.

6. The process according to claim 3, wherein the doping is performed in the absence of a solvent.

7. The process according to claim 3, wherein the doping is performed using 0.2 to 10 mole % of the dopant, based on the alkali metal aluminum hydride.

8. The process according to claim 7, wherein the doping is performed using 1 to 5 mole % of the dopant, based on the alkali metal aluminum hydride.

9. The process according to claim 1, wherein steps a) and b) are performed at a temperature greater than 100° C., but less than or equal to 300° C.

10. The process according to claim 1, wherein step b) is performed at a hydrogen pressure ranging from 0.1 to 100 bar above the hydrogen equilibrium pressure at the temperature at which step b) is performed.

11. The process according to claim 10, wherein step b) is performed at a hydrogen pressure ranging from 2 to 50 bar above the hydrogen equilibrium pressure at the temperature at which step b) is performed.

12. The process according to claim 1, wherein step a) is performed at a hydrogen pressure ranging from 0.1 bar below the hydrogen equilibrium pressure at the temperature at which step a) is performed to 0.1 bar.

13. The process according to claim 1, wherein step a) is performed at a hydrogen pressure ranging from 2–3 bar below the hydrogen equilibrium pressure at the temperature at which step a) is performed to 1 bar.

14. The process according to claim 1, wherein the alkali metal aluminum hydride of formula (1) is Na$_2$LiAlH$_6$.

15. The process according to claim 14, which comprises doping the Na$_2$LiAlH$_6$ with a dopant comprising a metal selected from the group consisting of transition metals of Groups III to V of the periodic table, iron, nickel and the rare earth metals, or a combination of said metals.

16. The process according to claim 1, wherein the alkali metal aluminum hydride of formula (1) is $NaAlH_4$.

17. The process according to claim 16, which comprises doping the $NaAlH_4$ with a dopant comprising a metal selected from the group consisting of transition metals of Groups III to V of the periodic table, iron, nickel and the rare earth metals, or a combination of said metals.

18. The process according to claim 1, wherein the alkali metal aluminum hydride of formula (1) is $Na_3AlH_6$.

19. The process according to claim 18, which comprises doping the $Na_3AlH_6$ with a dopant comprising a metal selected from the group consisting of transition metals of Groups III to V of the periodic table, iron, nickel and the rare earth metals, or a combination of said metals.

20. A composition of matter selected from the group consisting of:
 a) $Na_2LiAlH_6$;
 b) $Na_2LiAlH_6$ doped with a dopant comprising a metal selected from the group consisting of transition metals of Groups III to V of the periodic table, iron, nickel and the rare earth metals, or a combination of said metals;
 c) $NaAlH_4$ doped with a dopant comprising a metal selected from the group consisting of transition metals of Groups III to V of the periodic table, iron, nickel and the rare earth metals, or a combination of said metals; and
 d) $Na_3AlH_6$ doped with a dopant comprising a metal selected from the group consisting of transition metals of Groups III to V of the periodic table, iron, nickel and the rare earth metals, or a combination of said metals.

21. The composition of matter according to claim 20, which is $Na_2LiAlH_6$.

22. The composition of matter according to claim 20, which is $Na_2LiAlH_6$ doped with a dopant comprising a metal selected from the group consisting of transition metals of Groups III to V of the periodic table, iron, nickel and the rare earth metals, or a combination of said metals.

23. The composition of matter according to claim 20, which is $NaAlH_4$ doped with a dopant comprising a metal selected from the group consisting of transition metals of Groups III to V of the periodic table, iron, nickel and the rare earth metals, or a combination of said metals.

24. The composition of matter according to claim 20, which is $Na_3AlH_6$ doped with a dopant comprising a metal selected from the group consisting of transition metals of Groups III to V of the periodic table, iron, nickel and the rare earth metals, or a combination of said metals.

* * * * *